(12) United States Patent
Russell

(10) Patent No.: US 6,349,388 B1
(45) Date of Patent: Feb. 19, 2002

(54) TIMER PROCESSING ENGINE FOR SUPPORTING MULTIPLE VIRTUAL MINIMUM TIME TIMERS

(75) Inventor: Richard G. Russell, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/307,085

(22) Filed: May 7, 1999

(51) Int. Cl.$^7$ ................................................ G06F 1/14
(52) U.S. Cl. ...................................................... 713/502
(58) Field of Search .......................... 713/502; 702/89; 714/55

(56) References Cited

U.S. PATENT DOCUMENTS

| 4,160,154 A | | 7/1979 | Jennings ........................ 235/92 |
| 4,367,051 A | | 1/1983 | Inoue .......................... 368/111 |
| 5,023,771 A | * | 6/1991 | Kishi .......................... 710/260 |
| 5,297,275 A | | 3/1994 | Thayer ........................ 395/550 |
| 5,659,720 A | | 8/1997 | Fiacco et al. ................. 395/557 |
| 5,975,739 A | * | 11/1999 | Katayama et al. ......... 713/502 X |

* cited by examiner

Primary Examiner—Thomas M. Heckler
(74) Attorney, Agent, or Firm—Akin, Gump, Strauss, Hauer & Feld LLP

(57) ABSTRACT

A processor-oriented system provides a timer processing engine for supporting multiple virtual minimum time timers. The plurality of virtual minimum time timers of the timer processing engine includes a timer data structure suitable to store timer states of the plurality of virtual minimum time timers. Each timer state may include an elapsed time value, a last time value, a terminal time value, and a set of attributes. The timer states are processed by a timer state machine of the timer processing engine. The plurality of virtual minimum time timers further include a free running counter for providing a current time of the timer processing engine and a comparator for maintaining the timer states. The comparator maintains timer states by performing comparison operations for each virtual minimum time timer. When a virtual minimum time timer reaches a terminal time value, an interrupt generator of the timer processing engine may generate an interrupt.

22 Claims, 4 Drawing Sheets

TIMER PROCESSING ENGINE FOR SUPPORTING MULTIPLE VIRTUAL MINIMUM TIME TIMERS

BACKGROUND OF THE INVENTION

1. Field of the Invention

The present invention relates to timers for processor-oriented systems, and more particularly to a timer processing engine for supporting multiple virtual minimum time timers.

2. Description of the Related Art

As embedded applications become more complex, micr-controllers have experienced a superintegration of memory and peripheral blocks, rendering chip resources even more valuable. The embedded applications industry has responded to superintegration with an effort to provide just enough silicon to microcontrollers to achieve the contemplated functionality. Implementation strategies for minimizing total silicon real estate while maintaining acceptable levels of performance are thus needed.

In large or protocol intensive applications for processor-oriented systems, numerous timers are used to provide reset functionality, interrupt generation functionality, event triggering functionality, and other timing functions. During the execution of these applications, an operating system frequently checks the states for numerous timers. This polling of numerous timers has significantly contributed to software or processor overhead in processor-oriented systems.

Many timers for processor-oriented systems are minimum time timers. A minimum time timer is a way of indicating whether a particular time period has passed, as opposed to a timer for measuring the duration between events or the duration of events. In processor-oriented systems, a hardware platform has supported a limited number of minimum time timers, typically two to five minimum time timers.

A basic minimum time timer has included a counter, a set of registers, a comparator, and other circuitry. A conventional approach to providing an additional minimum time timer within a processor-oriented system has been to supply another counter, set of registers, comparator, and other circuitry. Adding minimum time timers to processor-oriented systems has thus involved hardware duplication. In an effort to minimize hardware overhead allocated for timing functions, processor-oriented systems have been limited to a relatively small number of minimum time timers.

SUMMARY OF THE INVENTION

Briefly, the present invention provides a timer processing engine for supporting multiple virtual minimum time timers. The plurality of virtual minimum time timers of the timer processing engine includes a timer data structure suitable to store the timer states of a plurality of virtual minimum time timers. Each timer state may include a last time value indicating the last time a timer was processed, an elapsed time value indicating the length of time a timer has been running, a terminal time value indicating a time at which a timer is to expire, and a set of attributes for indicating how a timer is to be processed. The timer states could be arranged in a variety of ways such as, for example, a linked list from a timer state with the shortest terminal time value to a timer state with the longest terminal time value. A timer state machine of the timer processing engine processes the timer states.

The plurality of virtual minimum time timers further includes a free running counter for providing a current time of the timer processing engine and a comparator for maintaining the timer states. An interrupt generator of the timer processing engine may selectively provide interrupt signals in response to the timer states.

In a disclosed embodiment, a timer state may be processed by the timer state machine in the following manner. When a virtual minimum timer begins running, the running attribute for the timer is set to a first predetermined state. When the timer state machine detects that a running attribute for a virtual minimum time timer is set to the first predetermined state, then an elapsed timer value for the virtual minimum time timer is incremented by the difference between the current time derived from the free running counter and a last time value for the virtual minimum time timer. If the timer state machine detects that the elapsed time value for the virtual minimum time timer is greater than or equal to the terminal time value for the virtual minimum time timer, then the running attribute for the virtual minimum time timer is set to a second predetermined state. If the timer state machine detects that a restart attribute for the virtual minimum time timer is set to a third predetermined state, then the elapsed time value for the virtual minimum time timer is set to a predetermined initial value, the last time value for the virtual minimum time timer is set to the current time, and the running attribute for the virtual minimum time timer is reset to the first predetermined state.

In accordance with the present invention, the timer processing engine provides a scalable approach to supporting an arbitrarily large number of timers and reduces the typical processor overhead and hardware overhead involved in managing timers.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

RELATED APPLICATIONS

The following related patent application is hereby incorporated by reference:

U.S. patent application Ser. No. 09/247,876, entitled "SCALABLE VIRTUAL TIMER ARCHITECTURE FOR EFFICIENTLY IMPLEMENTING MULTIPLE HARDWARE TIMERS WITH MINIMAL SILICON OVERHEAD."

Figure 1:
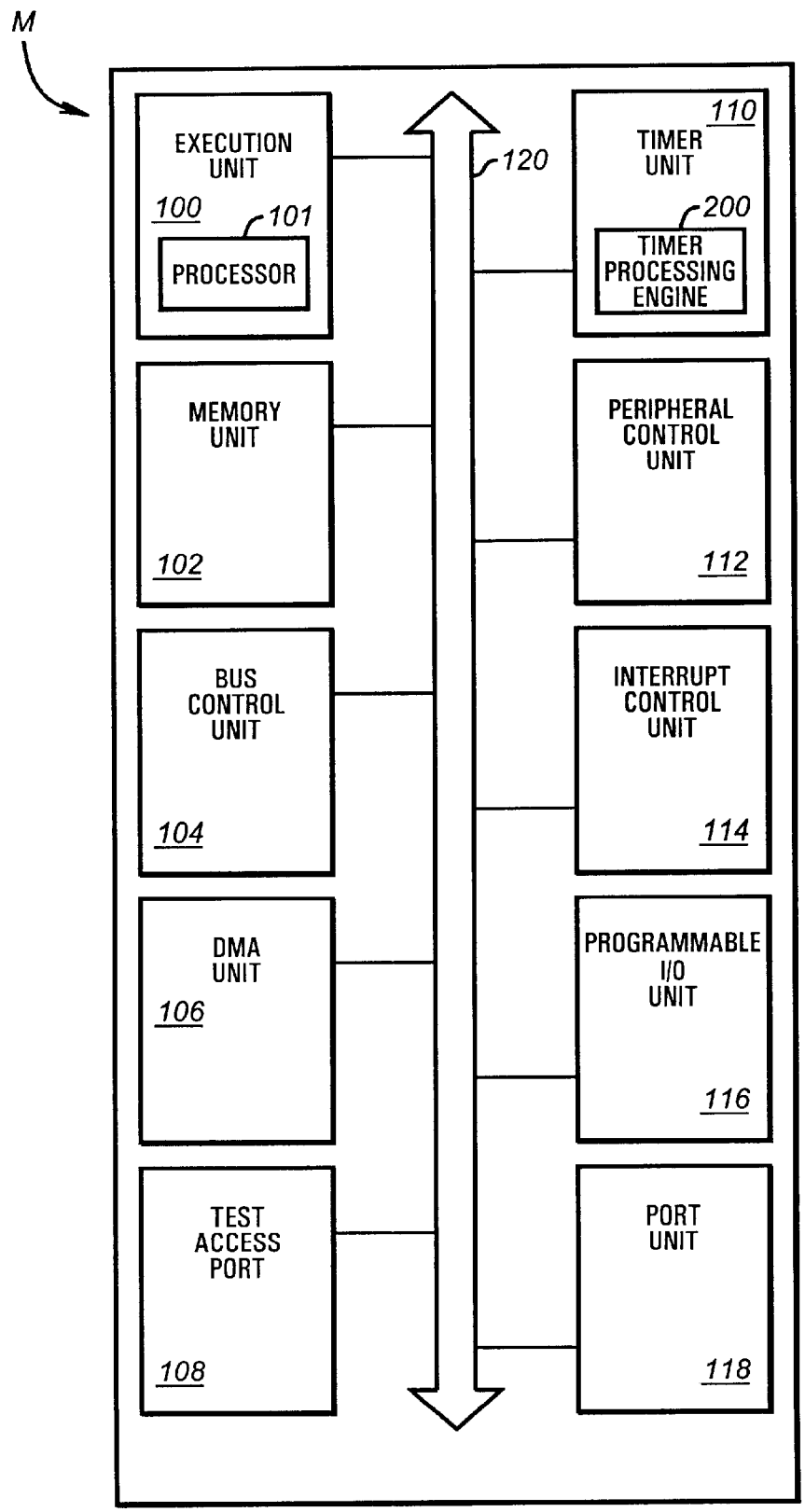
FIG. 1 is a block diagram of a microcontroller providing a timer processing engine in accordance with the present invention.

Turning now to the drawings, FIG. 1 shows a block diagram of an exemplary architecture for a microcontroller M in accordance with the present invention. The microcontroller M may support a variety of on-chip units. In the illustrated architecture, an execution unit 100, a memory unit 102, a bus control unit 104, a direct memory access (DMA) unit 106, a test access port 108, a timer unit 110, a peripheral control unit 112, an interrupt control unit 114, a programmable I/O unit 116, and a port unit 118 are each coupled to a system bus 120. The system bus 120 may include a data bus, address bus, and control bus for communicating data, addresses and control information between any of these coupled units.

The execution unit 100 may provide a highly integrated processor 101 for executing code stored by the memory unit 102. The execution unit 100 in the disclosed embodiment is compatible with the 16-bit and 32-bit×86 instruction set implemented in a variety of microcontrollers from Advanced Micro Devices, Inc. of Sunnyvale, Calif. A variety of other execution units could be used instead of the execution unit 100.

The memory unit 102 may support multiple memory controllers for controlling communication of data to and from off-chip memory devices. These memory devices for example may include dynamic random access memory (DRAM), read only memory (ROM), and/or flash memory. An example of a memory controller is a DRAM controller providing extended data out (EDO) and synchronous DRAM (SDRAM) support, write buffering support, and read-ahead buffering support.

The bus control unit 104 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. The bus control unit 104 thus permits the microcontroller M to support a number of external buses and peripherals.

The DMA unit 106 may provide multiple DMA controllers having several DMA channels for controlling direct memory access transfers between the units of the microcontroller M. The test access port 108 provides a scan interface for testing the microcontroller M in a production environment and supports a test access port (TAP) controller for controlling test logic of the port 108. In accordance with the present invention, the timer unit 110 provides a timer processing engine 200 (FIGS. 1 & 2) for supporting multiple virtual minimum time timers.

The peripheral control unit 112 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards.

The interrupt control unit 114 may provide multiple interrupt controllers for supporting several interrupt requests. Each interrupt controller may regulate issuance and acceptance of its associated interrupt requests. The programmable I/0 unit 116 supports several general-purpose I/O pins. These pins provide a parallel interface for external devices to the microcontroller M. The port unit 118 may provide a standard parallel port interface, serial port interface, and/or infrared port interface. The parallel port interface may support an enhanced parallel port (EPP) mode for high speed transfers. The serial port interface and infrared interface may be driven by an industry-standard universal asynchronous receiver/transmitter (UART) so as to permit PC compatibility.

A variety of configurations and combinations of these units of the microcontroller M are possible. The microcontroller M, for example, could be the Am186™ ED microcontroller, the Elan™ SC400 microcontroller, or the Am186™ CC microcontroller. It should be understood that the disclosed units are illustrative and not exhaustive. A number of the illustrated units could be eliminated, or added to, without detracting from the spirit of the invention. Further, selection of the particular units supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
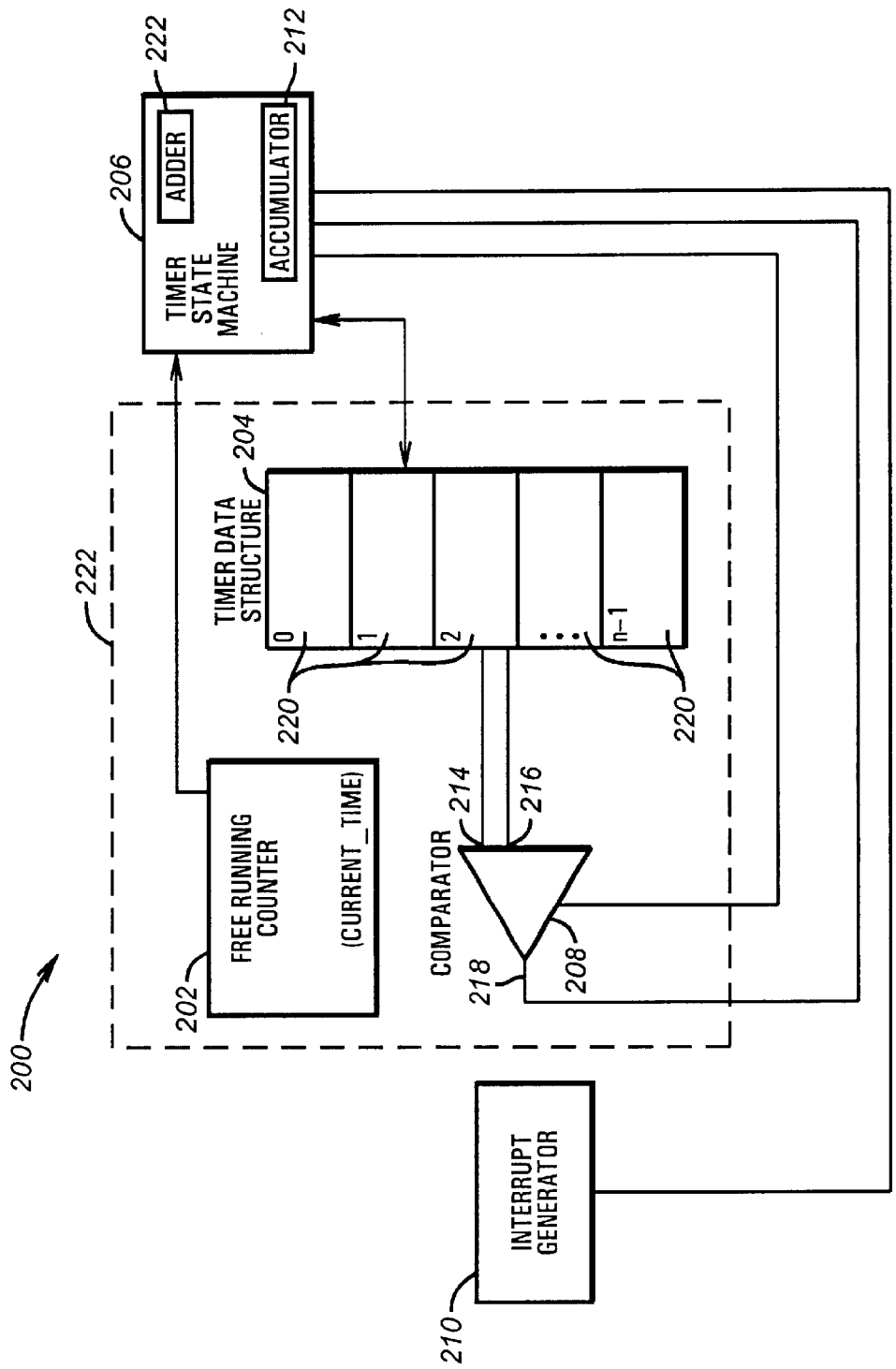
FIG. 2 is a schematic diagram of an exemplary embodiment of the timer processing engine of FIG. 1 in accordance with the present invention.

Referring to FIG. 2, a schematic diagram of an exemplary embodiment of the timer processing engine 200 is shown. The illustrated timer processing engine 200 includes a free running counter 202, a comparator 208, a timer data structure 204, a timer state machine 206, and an interrupt generator 210. The timer processing engine 200 may have a specific execution priority relative to the cores or units of the microcontroller M. For example, the timer processing engine 200 may have a lower priority than the cores of the microcontroller M such that the timer processing engine 200 essentially runs in the background.

The timer data structure 204 stores timer states for a plurality of virtual minimum time timers. The timer data structure 204 is shown divided into a plurality of memory sections or blocks 220. Each memory section 220 stores a timer state for a timer of the plurality of virtual minimum time timers. The timer data structure 204 may be stored in an on-chip or off-chip memory of the microcontroller M. The memory storing the timer data structure 204 may be of any of a variety of types (e.g., dynamic random access memory or content addressable memory). If a cache memory is available, the timer data structure 204 may be stored in the cache memory. In FIG. 2, the illustrated timer data structure 204 supports n (n representing any integer) timer states for n virtual minimum time timers.

The free running counter 202 provides a current time CURRENT_TIME of the timer processing engine 200. The timing for each virtual minimum time timer supported by the timer processing engine 200 is derived from the CURRENT_TIME. The use of a free running counter to support multiple virtual timers is also described in a commonly-owned patent application, entitled "SCALABLE VIRTUAL TIMER ARCHITECTURE FOR EFFICIENTLY IMPLEMENTING MULTIPLE HARDWARE TIMERS WITH MINIMAL SILICON OVERHEAD."

A comparator 208 may be utilized for maintaining the timer states stored by the timer data structure 204. The comparator 208 maintains the timer states by performing comparison operations for each timer. The illustrated comparator 208 includes an input terminal 214, an input terminal 216, and an output terminal 218. The input terminals 214 and 216 are both coupled to the timer data structure 204. The output terminal 218 is coupled to a timer state machine 206 described below.

It should be understood that a "virtual timer" in the present context generally refers to a special relationship between a free running counter and storage/comparison logic such as described herein for example. For the timer processing engine 200 embodiment illustrated in FIG. 2, the plurality of virtual minimum time timers designated by reference number 222 includes the free running counter 202, the comparator 208, and the timer data structure 204. An integration of the function of the comparator 208 and the timer data structure 204 into a memory device (e.g., content addressable memory) is possible.

The timer state machine 206 is coupled to the free running counter 202, the timer data structure 204, and the comparator 208. The free running counter 202 provides the current time CURRENT_TIME of the timer processing unit 200 to the timer state machine 206. The timer state of each timer is a function of the current time CURRENT_TIME provided by the free running counter 202.

The timer state machine 206 is configured for reading the timer states stored by the timer data structure 204 and for writing to those timer states. When a timer state is processed by the timer state machine 206, a timer state may be read by the timer state machine 206. The timer state read by the timer state machine 206 may be evaluated by the timer state machine 206. Based on the evaluation of a timer state by the timer state machine 206, the timer state may be written to by the timer state machine 206. The timer state machine 206 includes an adder 222 for performing adding operations for use in evaluating a timer state and further includes an accumulator 212 for storing results from comparison operations for use in evaluating a timer state.

The interrupt generator 210 of the timer processing engine 200 selectively provides interrupt signals in response to the timer states stored by the timer data structure 204. When a timer state reflects a terminating state of a timer, the timer state machine 206 signals the interrupt generator 210 to provide an interrupt signal.

Figure 3:
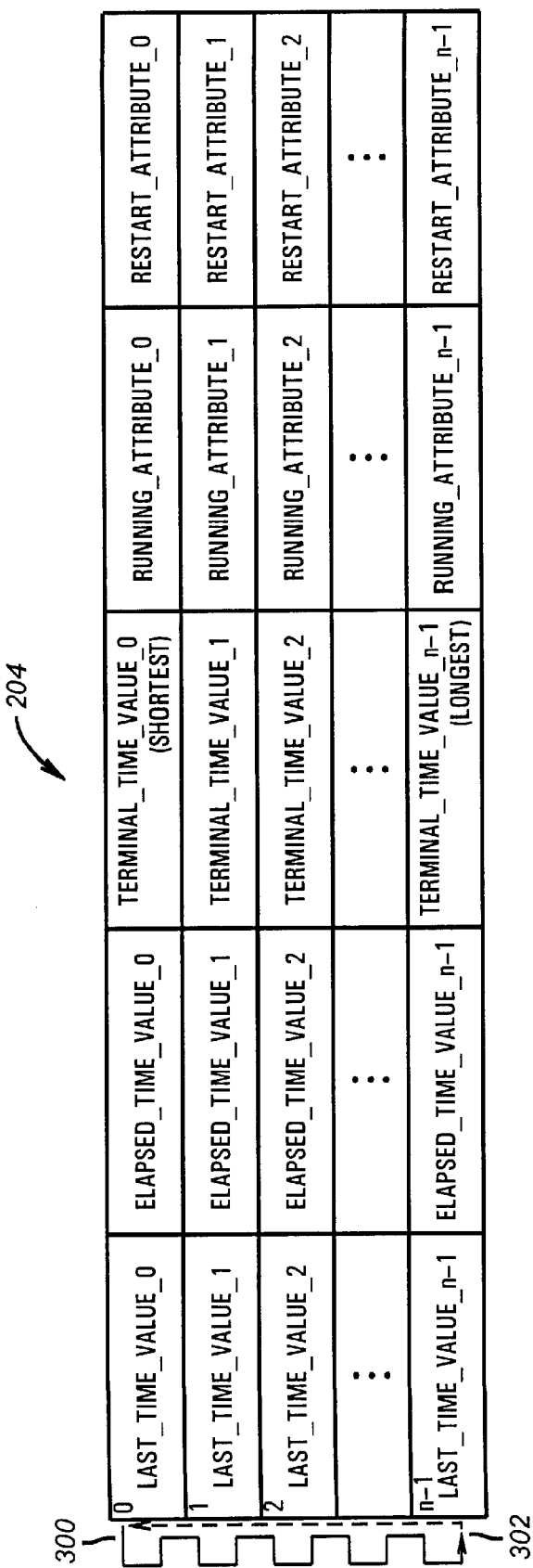
FIG. 3 is an illustration of an exemplary embodiment of the timer table of FIG. 2 in accordance with the present invention.

Referring to FIG. 3, an exemplary embodiment of the timer data structure 204 is shown. Each memory or section of the timer data structure 204 may store a timer state of a virtual minimum time timer. Each timer state may include a plurality of timer state variables. For each timer state, the illustrated timer table provides five timer state variables: LAST_TIME_VALUE, ELAPSED_TIME_VALUE, TERMINAL_TIME_VALUE, RUNNING_ATTRIBUTE and RESTART_ATTRIBUTE. LAST_TIME_VALUE is a timer state variable indicating the last time a virtual minimum time timer was processed. ELAPSED_TIME_VALUE is a timer state variable indicating the length of time a virtual minimum time timer has been running. TERMINAL_TIME_VALUE is a timer state variable indicating a time at which a virtual minimum time timer is to expire. When the CURRENT_TIME exceeds the TERMINAL_TIME_VALUE, a virtual minimum time timer is in a terminating state. RUNNING_ATTRIBUTE is a timer state variable for indicating whether a virtual minimum time timer is running. If RUNNING_ATTRIBUTE is set to TRUE, the timer is running. If RUNNING_ATTRIBUTE is set to FALSE, the timer is not running. RESTART_ATTRIBUTE is a timer state variable for indicating whether a virtual minimum time timer is to be restarted. If RESTART_ATTRIBUTE is set to TRUE, the timer is to be restarted. If RESTART_ATTRIBUTE is set to FALSE, the timer is not to be restarted. RUNNING_ATTRIBUTE and RESTART_ATTRIBUTE are exemplary attributes for a virtual minimum time timer. Other attributes for indicating how a virtual minimum time timer is to be processed are contemplated. In the illustrated table, each timer state variable name includes an integer (e.g., 0, 1, 2, or n−1) corresponding to the particular timer.

When the timer state machine 206 evaluates a timer state, specific timer state variables are evaluated. Evaluating a timer state variable may for example include comparing a timer state variable to a predetermined state. Evaluating a timer state variable may also include comparing a timer state variable with another timer state variable.

The illustrated ordering of the timer states is a linked list in time-out order determined at initialization of the microcontroller M. In processing such an ordering of the timer states, control iterates through the timer states in timeout order. That is, for each processing cycle, control begins at a timer with the shortest (or smallest) TERMINAL_TIME_VALUE (in the illustrated case, TERMINAL_TIME_VALUE_0) and concludes with a timer state having the longest (or largest) TERMINAL_TIME_VALUE (in the illustrated case, a TERMINAL_TIME_VALUE_n−1). After a processing cycle is complete, a new processing cycle is initiated as represented by arrow 302. The linked list can be redefined or updated periodically. It should be understood that the timer states may be sorted in a variety of ways other than a linked list in time-out order. The timer data structure 204 can be any data structure suitable for storing timer states. The timer data structure 204, for example, may be a table, a linked list, or a linked list of tables.

The illustrated processing of each timer state by the timer state machine 206 is represented by an arrow 300. For each timer state, there may be a read stage, an evaluation stage, and a write stage. The read stage for a timer is represented by a portion of the arrow 300 directed away from the memory section 220 corresponding to the particular timer state, and the write stage of a timer state is represented by a portion of the arrow 300 directed toward the memory section 220 corresponding to the particular timer state. After all timer states have been processed, another processing cycle may be initiated.

Figure 4:
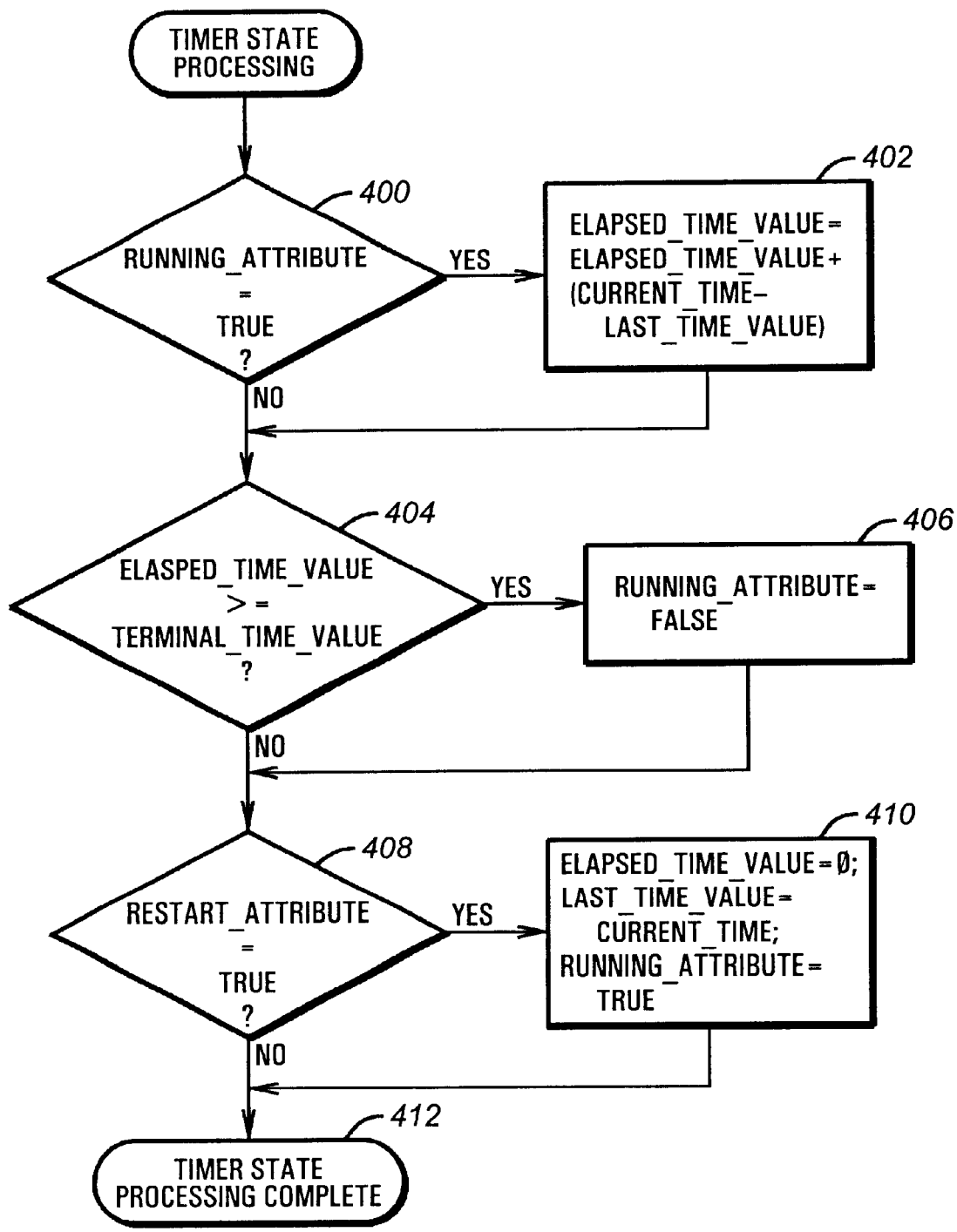
FIG. 4 is a flow chart of an exemplary timer state control process for each timer state stored by the timer table of FIGS. 2 and 3 in accordance with the present invention.

Referring to FIG. 4, a flow chart of an exemplary timer state control process for each timer state stored by the timer data structure 204 is shown. Timer state processing begins at step 400 where it is determined if RUNNING_ATTRIBUTE is set to TRUE. As noted above, a TRUE state indicates that the particular timer is running. If RUNNING_ATTRIBUTE is set to TRUE, then control proceeds to step 402. In step 402, an elapsed time value for the timer being processed is updated to reflect that the timer is running. The elapsed time value state variable ELAPSED_TIME_VALUE may be updated in the following manner: ELAPSED_TIME_VALUE=ELAPSE_TIME_VALUE+(CURRENT_TIME−LAST_TIME_VALUE).

From step 402, control proceeds to step 404. It should be understood that step 404 and other steps of the timer state control process may alternatively be performed through conditions other than the illustrated condition. If it is determined in step 400 that RUNNING_ATTRIBUTE is set to FALSE, then control proceeds from step 400 to step 404. In step 404, it is determined if the timer being processed has expired. This determination for example may be made by detecting if ELAPSED_TIME_VALUE is greater than or equal to TERMINAL_TIME_VALUE. If it is determined that the timer has expired, control proceeds from step 404 to step 406. In step 406, RUNNING_ATTRIBUTE is set to FALSE to indicate the timer is not running. From step 406, control proceeds to step 408. If it is determined in step 404 that the timer being processed has not expired, then control proceeds to step 408.

In step 408, it is determined if the particular timer is to be restarted. This determination may be made by detecting if RESTART_ATTRIBUTE is set to TRUE. If the timer is to be restarted, then control proceeds to step 410 where the appropriate timer state variables are updated to reflect restarting of the timer. The update to the appropriate timer state variables for example may be performed in the following manner:

ELAPSED_TIME_VALUE=Ø;
LAST_TIME_VALUE=CURRENT_TIME;
RUNNING_ATTRIBUTE=TRUE.

From step 410, control proceeds to step 412 where timer state processing is complete. If it is determined in step 408 that a timer is not to be restarted, then control proceeds to step 412. It should be understood that the order of certain steps of the timer state control process may vary. It is further contemplated that certain steps executed in a previous processing cycle may be skipped depending on the determinations made in those steps. For example, if the timer state machine 206 on a previous processing cycle determined through step 400 that a timer is running, step 400 may be skipped in subsequent processing cycles of the timer provided the timer state machine 206 has not detected expiration of the timer.

The timer state control process is applicable to any timer supported by the timer processing engine 200. That is, the timer state control process is not restricted to the timing characteristics of any particular timer. As a result, timers for various applications may be processed in accordance with the timer state control process.

The disclosed timer processing engine can reduce both processor overhead and hardware overhead. By providing a timer processing engine for managing timers independent of a processor, processor overhead is reduced. By supporting timer states for a plurality of virtual minimum time timers, hardware overhead is reduced. For a conventional processor-oriented system, in order to maintain timer values for a plurality of timers, it has been necessary to provide a plurality of counters. A counter has been needed to accumulate (increment or decrement) a timer value for each particular timer. In accordance with the present invention, the timing for each timer of a plurality of virtual minimum time timers may be derived from a single free running counter. Hardware overhead in the form of a plurality of decrementers/counters for a plurality of timers is therefore eliminated. A timer processing engine (i.e., free running counter, comparator, timer data structure to store timer states, and timer state machine) thus supports an arbitrarily large number of timers with reduced hardware overhead and processor overhead.

The foregoing disclosure and description of the invention are illustrative and explanatory thereof, and various changes in the circuitry, connections, components, variables, data structure types, and steps, as well as in the details of the illustrated structure hardware and software) and method of operation may be made without departing from the spirit of the invention.

What is claimed is:

1. A timer processing engine for supporting multiple virtual minimum time timers, comprising:
   a plurality of virtual minimum time timers, comprising:
      a free running counter for providing a current time of the timer processing engine;
      a comparator coupled to the free running counter for maintaining timer states of the plurality of virtual minimum time timers; and
      a timer data structure suitable to store the timer states of the plurality of virtual minimum time timers; and
   a timer state machine for processing the timer states of the plurality of virtual minimum time timers.

2. The timer processing engine of claim 1, further comprising:
   an interrupt generator for selectively providing interrupt signals in response to the timer states of the plurality of virtual minimum time timers.

3. The timer processing engine of claim 1, wherein a timer state of a virtual minimum time timer of the plurality of virtual minimum time timers comprises a last time value indicating a last time the virtual minimum time timer was processed by the timer processing control logic.

4. The timer processing engine of claim 1, wherein a timer state of a virtual minimum time timer of the plurality of virtual minimum time timers comprises an elapsed time value indicating a length of time the virtual minimum time timer has been running.

5. The timer processing engine of claim 1, wherein the timer state of a virtual minimum time timer of a plurality of virtual minimum time timers comprises a terminal time value indicating a time at which the virtual minimum time timer is to expire.

6. The timer processing engine of claim 1, wherein the timer state of a virtual minimum time timer of a plurality of virtual minimum time timers comprises a set of attributes for indicating how the virtual minimum time timer is to be processed by the timer processing control logic.

7. The timer processing engine of claim 6, wherein the set of attributes comprises a running attribute indicating whether the virtual minimum time timer is running.

8. The timer processing engine of claim 6, wherein the set of attributes comprises a restart attribute indicating whether the virtual minimum time timer is to be restarted.

9. The timer processing engine of claim 1, the timer data structure comprising:
   a linked list from a timer state with a shortest terminal time value to a timer state with a longest terminal time value.

10. The timer processing engine of claim 1, the timer data structure comprising:
    a timer table to store the timer states of the plurality of virtual minimum time timers.

11. A microcontroller adapted for supporting multiple virtual minimum time timers comprising:
    an execution unit; and
    a timer unit coupled to the execution unit, comprising:
       a timer processing engine for supporting multiple virtual minimum time timers, comprising:
          a plurality of virtual minimum time timers, comprising:
             a free running counter for providing a current time of the timer processing engine;
             a comparator coupled to the free running counter for maintaining timer states of the plurality of virtual minimum time timers; and a timer data structure suitable to store the timer states of the plurality of virtual minimum time timers; and a timer state machine for processing the timer states of the plurality of virtual minimum time timers.

12. The microcontroller of claim 11, the timer processing engine further comprising:

an interrupt generator for selectively providing interrupt signals in response to the timer states of the plurality of virtual minimum time timers.

13. The microcontroller of claim 11, wherein a timer state of a virtual minimum time timer of the plurality of virtual minimum time timers comprises a last time value indicating a last time the virtual minimum time timer was processed by the timer processing control logic.

14. The microcontroller of claim 11, wherein a timer state of a virtual minimum time timer of the plurality of virtual minimum time timers comprises an elapsed time value indicating a length of time the virtual minimum time timer has been running.

15. The microcontroller of claim 11, wherein the timer state of a virtual minimum time timer of a plurality of virtual minimum time timers comprises a terminal time value indicating a time at which the virtual minimum time timer is to expire.

16. The microcontroller of claim 11, wherein the timer state of a virtual minimum time timer of a plurality of virtual minimum time timers comprises a set of attributes for indicating how the virtual minimum time timer is to be processed by the timer processing control logic.

17. The microcontroller of claim 16, wherein the set of attributes comprises a running attribute indicating whether the virtual minimum time timer is running.

18. The microcontroller of claim 16, wherein the set of attributes comprises a restart attribute indicating whether the virtual minimum time timer is to be restarted.

19. A method of processing a plurality of virtual minimum time timers of a timer processing engine, the plurality of virtual minimum time timers including a free running counter, each virtual minimum time timer of the plurality of virtual minimum time timers having a timer state including an elapsed timer value indicating a length of time the virtual minimum time timer has been running, a last timer value indicating a last time the virtual minimum time timer was processed by the timer processing engine, a terminal time value indicating a time at which the virtual minimum time timer is to expire, and a set of attributes for indicating how the virtual minimum time timer is to be processed by the timer processing engine, the set of attributes including a running attribute for indicating whether the virtual minimum time timer is running, comprising the step of:

incrementing the elapsed timer value for a virtual minimum time timer of the plurality of virtual minimum time timers by the difference between a current time of the timer processing engine derived from the free running counter and the last time value for the virtual minimum time timer if the running attribute of the virtual minimum time timer is set to a first predetermined state.

20. The method of claim 19, further comprising the step of:

setting the running attribute of the virtual minimum time timer to a second predetermined state if the elapsed time value for the virtual minimum time timer is greater than or equal to the terminal time value for the virtual minimum time timer.

21. The method of claim 19, the set of attributes further including a restart attribute for indicating whether the virtual. minimum time timer is to be restarted, further comprising the step of:

setting the elapsed time value for the virtual minimum time timer to a predetermined initial value, the last time value for the virtual minimum time timer to the current time, and the running attribute of the virtual minimum time timer to the first predetermined state if a restart attribute of the virtual minimum time timer is set to a third predetermined state.

22. A timer processing engine for supporting multiple virtual minimum time timers, comprising:

a means for providing a current time of the timer processing engine;

a means for storing a plurality of timer states corresponding to a plurality of virtual minimum time timers;

a means for maintaining the plurality of timer states coupled to the means for storing a plurality of timer states; and a means for processing the plurality of timer states coupled to the means for providing a current time of the timer processing engine, the means for storing a plurality of timer states, and the means for maintaining the plurality of timer states.

* * * * *